Patented Feb. 18, 1947

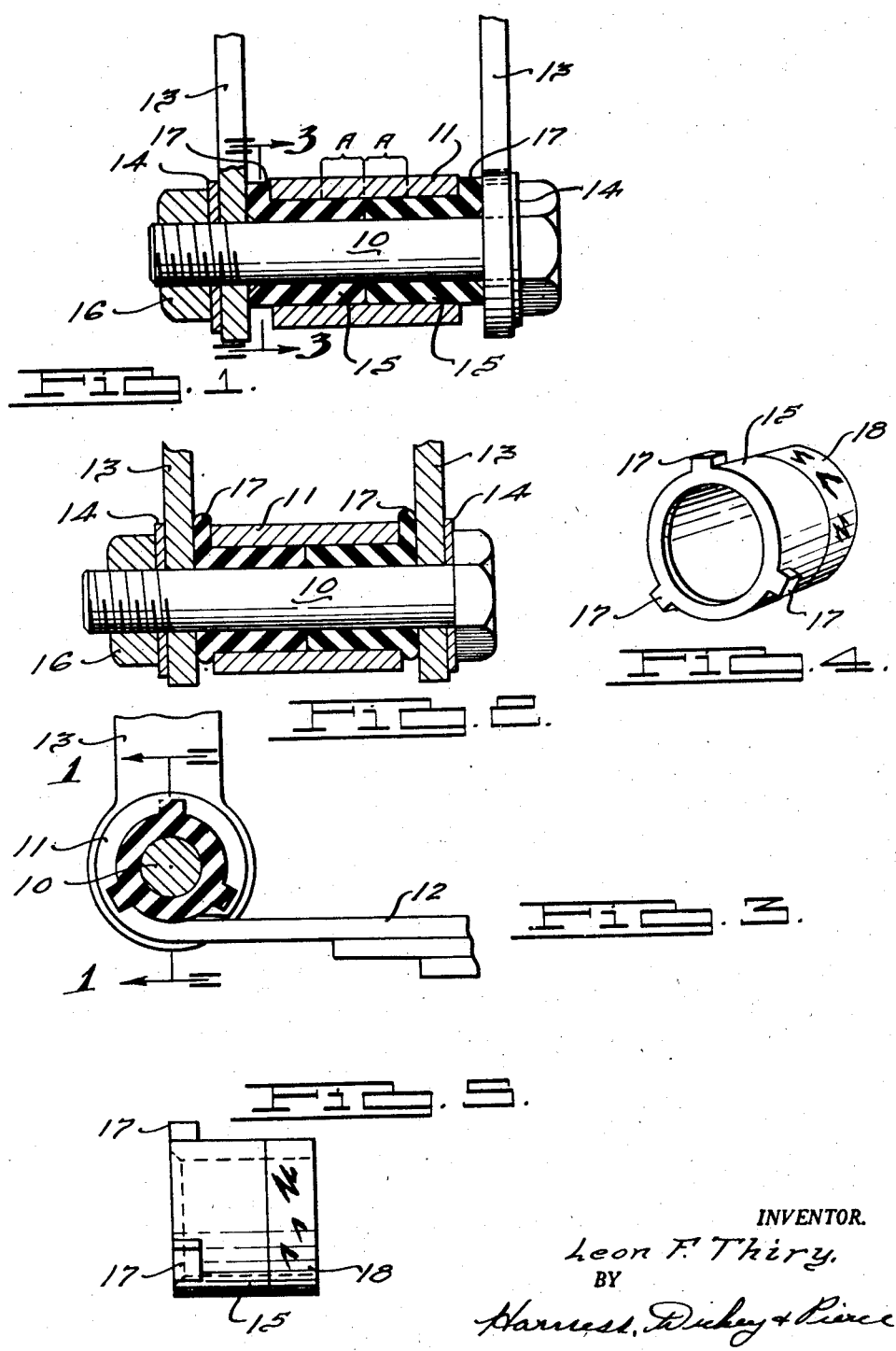

2,416,243

UNITED STATES PATENT OFFICE 2,416,243

RUBBER BEARING AND INSERT THEREFOR

Leon F. Thiry, Montclair, N. J., assignor to The General Tire & Rubber Company, Akron, Ohio, a corporation of Ohio Application August 12, 1943, Serial No. 498,352

3 Claims. (Cl. 287—85)

1

The present invention relates to oscillating bearings of the type employing a pair of bushings formed of rubber or a rubber-like material which fill the space between the relatively moving inner and outer cylindrical bearing members and which are placed under compression by means of thrust elements located at opposite sides of the bearing and movable axially toward the center of the bearing.

In oscillating bearings of the above type, it is essential that no slippage occur between the rubber bushings and the inner and outer bearing members, since the existence of any relative movement between the rubber and metal parts of the bearing will result in rapid destruction of the rubber. In order to prevent such undesirable slippage, it is essential that the entire mass of rubber be under very substantial compressive forces so that all portions will be forced tightly into contact with the inner and outer bearing members. It has hitherto been assumed that because rubber is a relatively incompressible material the compression force applied at the outer ends of the rubber bushings was transmitted uniformly throughout the mass without any appreciable flow or movement of the rubber mass. However, it has long been recognized that slippage does occur, particularly between the rubber bushings and the inner bearing member unless the relative angular movement between the inner and outer bearing members is very limited, and that this difficulty is materially increased as the length of the bearing is increased in proportion to its diameter.

Applicant has discovered that the difficulty with bearings of this type as previously constructed results from the fact that due to minute variations in the dimensions of the inner and outer bearing members, as well as the dimensions of the rubber bushings, themselves, a minute flow or movement of the rubber bushings toward the center of the bearing is required in order to completely fill the space and thus build up a sufficient pressure between the rubber bushings and the metal bearing parts; and that the difficulty with prior constructions has been that the friction between the rubber bushings and the metal bearing parts has resisted the necessary axial movement sufficiently to prevent the necessary movement and, consequently, the transmission of compression forces.

Applicant has also discovered that the flanges commonly employed upon the rubber bushings for the purpose of locating the inner and outer bearing members relative to each other in an axial direction, materially interfere with the necessary flow and movement of the material, as well as the transmission of the compression force.

Accordingly, it is the object of the present invention to provide an improved bearing of the type mentioned characterized by the fact that for a given bearing it will permit a greater angle of oscillation between the inner and outer bearing members without slippage than is possible with prior constructions.

Other objects and advantages of the invention will become apparent from the following specification, the drawings relating thereto, and from the claims hereinafter set forth.

Referring to the drawings, in which like numerals are used to designate like parts in the several views throughout:

Figure 1 is a sectional view taken on the line 1—1 of Figure 3 of a more or less conventionalized spring shackle bearing, illustrating one embodiment of the invention and showing the parts in the position they assume prior to the application of axial compression;

Figure 2 is a view similar to Figure 1 showing the position of the parts after the bearing has been tightened up to apply the necessary axial compression;

Figure 3 is a sectional view taken on the line 3—3 of Figure 1;

Figure 4 is a perspective view of one of the rubber bushings; and

Figure 5 is a side view of the bushing shown in Figure 4.

Referring to Figure 1, the bearing is made up of a central bearing member comprising a pin or bolt 10 and a cylindrical outer bearing member 11 which, in the particular embodiment illustrated, constitutes an eye formed at the end of a leaf spring 12, shown best in Figure 3. Mounted on the inner bearing member is a pair of links 13, each of which is held against rotation with respect to the inner bearing member 10 in any suitable manner, as by means of lock washers 14 between the nut and the head of the bolt and the two links 13.

It will be appreciated that the particular arrangement of inner and outer bearing members may vary widely for different applications, and that the construction illustrated is merely illustrative of one possible construction.

As is conventional, the bearing is provided with a pair of cylindrical bushings 15, which are identical in construction and which fill the space between the inner and outer members, the two bushings being in end-to-end abutment at the central portion of the bearing and projecting outwardly beyond the ends of the outer bearing member 11 and into contact with the links 13 or other compression members adapted to force the two bushings toward each other and develop the necessary pressure between the bushings and the inner and outer bearing members. A nut 16 on the inner bearing member or bolt 10 is provided for the purpose of applying the necessary axial compression force.

In prior bearings of the type under consideration end flanges are provided on the bushings, which flanges contact the ends of the outer bearing member 11 entirely around its circumference and serve to locate the inner bearing member relative to the outer bearing member in an axial direction. Applicant has found that these flanges prevent the flow of rubber and, consequently, the transmission of pressure to the inner ends of the bushings because, when pressed between the end thrust members on the inner bearing member and the ends of the outer bearing member, the flanges are deformed and build up a high initial pressure between the inner and outer bearing members at the ends of the outer bearing member before the necessary axial flow occurs.

In the ideal construction, the bushings 15 would be constructed as purely cylindrical elements, so that no pinching of the insert between the end thrust members 13 and the ends of the bearing member 11 would occur until after the pressure had been transmitted throughout the bushings. However, practical considerations in connection with the assembly of bearings of this type require the provision of some means to locate the bushings axially with reference to the outer bearing member 11 and, accordingly, there is provided in accordance with the present invention one or more integrally formed lugs 17 at the outer ends of the bushings 15.

The lugs 17 project radially to a limited extent and are of very limited extent circumferentially of the bushings. In the particular embodiment illustrated, three such lugs 17 are provided. These lugs engage the ends of the outer bearing member 11 when the inner ends of the bushings contact each other or substantially contact each other and thus serve to locate the bushings with respect to the outer bearing member. However, in view of their limited circumferential extent, they do not interfere appreciably with the requisite flow of the rubber material toward the center of the bearing and thus permit the pressure to be transmitted to the central portions of the bearing adjacent the inner ends of the bushings 15 to a materially greater extent than is possible when a complete locating flange is employed.

When the nut 16 is tightened, the initial effect is to force the bushings inwardly toward each other and transmit the compression force toward the interior of the bearing, following which the protruding portion of the bushing 15 will be extruded radially, as illustrated in the lower portion of Figure 2. At the same time, the lugs 17 will be extruded radially, as shown in the upper portion of Figure 2.

Any desired number and arrangement of locating lugs or projections may be provided on the bushing. It is only essential that the locating projections which are squeezed between the member 13 and the end of the outer bearing member before the bearing is fully tightened be of limited circumferential extent.

Further improvement in the performance of the bearing is provided in accordance with the present invention by coating or otherwise treating portions of each bushing to provide a surface of relatively low coefficient of friction, since by that means the frictional resistance between the rubber bushing and the inner or outer bearing members or both, which interferes with the minute inward flow required to fill the entire space between the bearing members during assembly, is materially reduced and, consequently, the pressure developed within the bearing is more uniform and the pressure at the center materially higher than otherwise possible.

As best shown in Figures 4 and 5, in the particular bearing illustrated the bushings 15 are provided with a surface area 18 at their inner ends, which surfaces are in the finished bearing located in the areas indicated by the brackets A—A in Figure 1. The surface 18 is treated in any suitable manner to provide a smooth surface which will have a smaller coefficient of friction with the outer bearing member 11. This may be accomplished, for example, by coating the area 18 with a very thin film of a methacrylate resin or with a varnish or a drying oil, such as tung oil, perilla oil, linseed oil or dehydrated castor oil, or by a semi-drying oil, such as soya bean oil, or in any other desired manner. It may also be accomplished by wrapping an adhesive coated tape of plastic material, such as "Cellophane" and the like, around the inner end of the bushing.

The treated area is preferably located only on the outer surface of the bushing and hence contacts only the outer bearing member 11, in view of the fact that there is a greater tendency to slippage between the rubber bushing and the inner bearing member than between the bushing and the outer member in bearings of this type. While the entire outer surface of the bushing may be coated or treated to advantage, it is preferred to coat only the inner end of the outer surface, as illustrated, since there then results a greater resistance to slippage at the outer surface during the operation of the bearing. If desired, the bushing may also be coated at the inner end portion of its inner surface, but the entire inner surface should not be coated since the resulting reduction in friction would be undesirable.

The coatings mentioned above have the property of staying in place, since they are highly cohesive, and hence may be employed where only a partial coating is desired. If the entire outer surface is coated, this requirement need not be met and a less cohesive coating, such as wax or tallow, may be employed. While the slippery area might appear to increase the tendency of slippage between the bushing and the metal bearing member, the contrary result occurs due to the greater pressure that develops. The reduced coefficient of friction between the outer surface of the bushing and the outer member is compensated for by the fact that there is a larger lever arm and larger area and hence less force tending to cause slippage at the outer surface than at the inner surface, and by the further fact that a greater pressure between the bushing and the bearing members can be realized. Moreover, the coating on the surface 18 may be made very thin, so that if any slippage does occur initially the coating will be quickly destroyed, whereupon the slippage will cease due to the relatively high pressure present.

While in the embodiment illustrated in the drawings both the locating lugs and the specially treated area 18 are incorporated in a single bushing, it will be apparent that either one of these features may be employed alone to advantage.

It will also be appreciated that in place of natural vulcanized rubber, the bushings of the present invention may be formed of synthetic rubber or rubber-like materials, and that such are included within the term "rubber" as used herein.

While only one specific embodiment of the invention has been shown and described, it will be apparent that various changes and modifications may be made without departing from the spirit of the invention, the scope of which is commensurate with the appended claims.

What is claimed is:

1. A rubber bushing for an oscillating bearing of the type in which the bushing is subject to axial compression, comprising a cylindrical rubber bushing having adjacent one end thereof a radial projection of limited circumferential extent adapted to engage the end of the outer bearing member.

2. A rubber bushing for an oscillating bearing of the type in which the bushing is subject to axial compression, comprising a cylindrical rubber bushing having at one end thereof a cylindrical area which is coated with a material forming a solid film having a smaller coefficient of friction than the remaining surface of the bushing.

3. A rubber bushing for an oscillating bearing of the type in which the bushing permits normal angular movements between inner and outer rigid members solely by shear deformation of the bushing and in which the bushing is subject to axial compression and is subjected to radial confining pressure between co-operating bearing members, comprising a cylindrical rubber bushing having at one end thereof a radial projection of limited circumferential extent and a cylindrical area adapted to contact the central portion only of one of the co-operating bearing members, which area is of substantially less coefficient of friction than the remaining surface of the bushing.

LEON F. THIRY.

REFERENCES CITED

The following references are of record in the file of this patent:

UNITED STATES PATENTS

| Number | Name | Date |
|---|---|---|
| 2,240,709 | Mead | May 6, 1941 |
| 2,290,678 | Dodge | July 21, 1942 |
| 1,739,270 | Thiry | Dec. 10, 1929 |
| 1,782,770 | Thiry | Nov. 25, 1930 |
| 1,845,858 | Watson et al. | Feb. 16, 1932 |
| 2,308,967 | Kuss | Jan. 19, 1943 |
| 2,358,518 | Kraft | Sept. 19, 1944 |
| 2,215,743 | Saurer | Sept. 24, 1940 |

FOREIGN PATENTS

| Number | Country | Date |
|---|---|---|
| 243,679 | British | Jan. 24, 1927 |